United States Patent [19]

Shih et al.

[11] Patent Number: 4,985,487
[45] Date of Patent: Jan. 15, 1991

[54] ZWITTERION POLYMERS

[75] Inventors: Jenn S. Shih, Paramus; Terry E. Smith, Morristown, both of N.J.

[73] Assignee: GAF Chemicals Corporation, Wayne, N.J.

[21] Appl. No.: 463,710

[22] Filed: Jan. 11, 1990

[51] Int. Cl.$^5$ .............................................. C08F 8/32
[52] U.S. Cl. ................................... 524/548; 524/549; 525/376.9; 525/327.6; 525/329.6; 525/380; 525/382
[58] Field of Search ............... 525/326.9, 327.6, 329.6; 524/548, 549

[56] References Cited

U.S. PATENT DOCUMENTS 4,308,188 12/1981 Wicks et al. ..................... 525/380

Primary Examiner—Bernard Lipman
Attorney, Agent, or Firm—Walter Katz; Marilyn J. Maue; Joshua J. Ward

[57] ABSTRACT

Zwitterion polymers are provided herein having the formula:

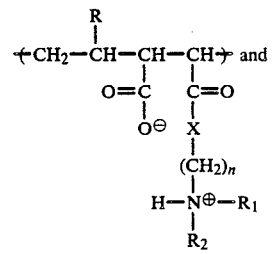

and

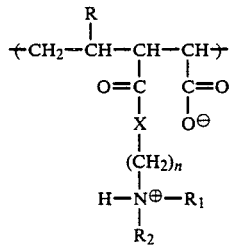

where
R is OR', where R' is $C_1$–$C_8$ alkyl or a lactam,
X is oxygen or nitrogen,
n is 2–10, and
$R_1$ and $R_2$ are each independently $C_1$–$C_8$ alkyl, and mixtures thereof.

7 Claims, No Drawings

ZWITTERION POLYMERS

BACKGROUND OF THE INVENTION

1. Field of the Invention

This invention relates to polymers useful in cosmetic formulations.

2. Description of the Prior Art

Cosmetic formulations using maleic anhydride interpolymers are described in U.S. Pat. Nos. 3,974,128 and 3,684,776. However, it is desired to provide new and improved cosmetic compositions containing polymers which can find particular application in shampoo and hair conditioner products.

SUMMARY OF THE INVENTION

Zwitterion polymers are provided herein having the formulas:

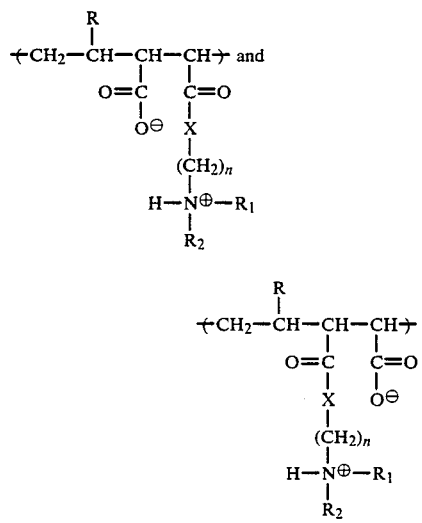

where
R is OR', where R' is $C_1$-$C_8$ alkyl or a lactam
X is oxygen or nitrogen,
n is 2-10, and
$R_1$ and $R_2$ are each independently $C_1$-$C_8$ alkyl,
and mixtures thereof.

The zwitterion polymers thus comprise segments derived from:
(a) maleic anhydride, and
(b) alkyl vinyl ether or vinyl lactam;
(a) and (b) copolymer being modified up to 100% by half-esterification with an N,N-dialkylalkanolamine or half-amidation with an N,N-dialkylamino alkylamine.

The zwitterion polymers of the invention are formed in water by internal transfer of the proton of a carboxylic acid group to the dialkyl amino group of the half-ester or half-amide.

The zwitterion polymers thus have both positive and negative charges in the molecule, a positive charge on the ammonium group and a negative charge on the carboxylate group.

The zwitterion polymers herein find particular application in cosmetic preparations, such as shampoo and hair conditioner products.

DETAILED DESCRIPTION OF THE INVENTION

The starting copolymers for modification in accordance with the invention are made by polymerizing (a) an alkyl vinyl ether, e.g. a $C_1$-$C_8$ alkyl vinyl ether, such as methyl, ethyl, butyl, etc. vinyl ether; or a vinyl lactam such as vinyl pyrrolidone or vinyl caprolactam; and (b) maleic anhydride.

These copolymers are modified by half-esterification with an N,N-dialkylalkanolamine, such as N,N-dimethylethanolamine, or half-amidated with an N,N-dialkylaminoalkylamine, such as N,N-dimethylaminoethylamine.

After modification, the tertiary amino group of the modified polymer, when placed in water, can accept the proton of the carboxylic acid group to form a zwitterion polymer having both a cationic ammonium group and an anionic carboxylate group. Thus, at about a pH of 7, this zwitteroon polymer can exhibit amphoteric behavior, with both cationic and anionic moieties in the polymer. Furthermore, at about a pH $>7$, the polymer is only anionic, while at about a pH $<7$ the polymer is only cationic.

Accordingly, the zwitterion polymers of the invention find particular application in hair preparation and styling formulations, such as shampoo and conditioner products, for the following reason. Since hair normally is negatively charged, an anionic shampoo is desired for effective washing. However, for coating a film on hair with a conditioner, it is necessary to use a cationic polymer. In this invention, at about pH 7, the zwitterion polymer can function as both an anionic and cationic polymer, thus affording both shampoo and conditioner action within a single polymer. Furthermore, when used in formulations having about a pH $>7$, it is an effective shampoo; while at about pH $<7$, it is a useful conditioner.

The modification step can be carried out by precipitation of the modified copolymer from a solution of the starting copolymer in a suitable solvent. For example, a maleic anhydride - methyl vinyl ether copolymer can be modified with N,N-dimethylethanol in acetone solution to form a copolymer modified up to 100% with a half-ester group.

Similarly, a maleic anhydride - vinyl pyrrolidone copolymer can be half-esterified with N,N-dimethylethanol in methyl ethyl ketone.

Half-amidation can be carried out in the same solvents using N,N-dimethylaminoethyl amine.

The molecular weight of the zwitterion polymers of the present invention can be varied depending upon the molecular weight of the starting copolymer.

The invention will now be described with reference to the following examples.

EXAMPLE 1

Copolymers of Maleic Anhydride/Alkyl Vinyl Ether Modified by N,N-Dimethylethanol Amine A 1-liter, four-necked round bottom flask equipped with thermometer, condenser, dropping funnel and a mechanical stirrer, was charged with 50 g. (0.32 mol of repeating unit) of maleic anhydride-methyl vinyl ether copolymer, and 600 g. of acetone and heated to 35° C. to homogenize the solution. Then N,N-dimethylethanol amine (28.5 g., 0.32 mole) was added slowly during about an hour. The solution thereafter was refluxed for 24 hours and cooled to room temperature. The precipitate was filtered, washed with acetone and dried at 85° C. under vacuum. The yield was 95%.

EXAMPLE 2

Copolymers of Maleic Anhydride/Alkyl Vinyl Ether Modified by N,N-Dimethylaminoethyl Amine A 1-liter, four-necked round bottom flask equipped with thermometer, condenser, dropping funnel and a mechanical stirrer was charged with maleic anhydride-methyl vinyl ether (50 g., 0.32 mol repeating unit) and acetone (700 g) and heated to reflux. Then N,N-dimethylaminoethyl amine (28.2 g., 0.32 mol) was slowly added during 30 minutes. The solution was stirred while refluxing for another 6 hours. The precipitate was filtered, washed with acetone and dried in a vacuum oven at 40° C. The yield was 95%.

EXAMPLE 3

Copolymer of Maleic Anhydride-Vinyl Pyrrolidone Modified by N,N-Dimethylethanol Amine Poly(maleic anhydride/vinyl pyrrolidone) 50 g (0.24 mol repeating unit) and 2-butanone (450 g) were charged into a four-necked round bottom flask equipped with thermometer, condenser, dropping funnel and a mechanical stirrer. N,N-dimethylethanol amine (21.3 g, 0.24 mol) was added slowly in 30 minutes and the solution was refluxed for 22 hours. The solution was filtered and the precipitated material was dried in a vacuum oven at 85° C.

EXAMPLE 4

Copolymer of Maleic Anhydride-Vinyl Pyrrolidone Modified by N,N-Dimethylaminoethyl Amine A 1-liter, four-necked round bottom flask equipped with thermometer, condenser, dropping funnel and a mechanical stirrer was charged with CD-262 (50 g, 0.24 mol repeating unit) and 2-butanone (700 g). N,N-dimethylaminoethyl amine (21.1 g, 0.24 mole) was added in 30 minutes and the solution was refluxed for 20 hours. The precipitated material was filtered and dried in a vacuum oven at 40° C.

EXAMPLE 5

Copolymers of Maleic Acid-Vinyl Pyrrolidone Modified by N,N-Dimethylethanol Amine The hydrolysis product of poly(maleic anhydride/vinyl pyrrolidone) (50 g, 0.24 mole repeating unit) and 2-butanone (550 g) were charged in a 1-liter, four-necked round bottom flask equipped with condenser, dropping funnel, thermometer and a mechanical stirrer. N,N-dimethylethanol amine (21.3 g, 0.24 mole) was added in 30 minutes and heated to reflux for 24 hours. The precipitate was filtered and dried in a vacuum oven.

EXAMPLE 6

Preparation of Zwitterion Polymers of Invention

The modified polymers prepared above were dissolved in an aqueous solution having a pH of 7. In this solution, amphoteric ionic behavior was observed, with both cationic and anionic characteristics being present in the polymer. NMR analysis confirmed this amphoteric structure.

It is to be understood that the above examples are provided to illustrate specific and preferred embodiments of the invention and that many modifications and alterations can be made in these examples without departing from the scope of the invention.

What is claimed is:

1. Zwitterion polymers having the formulas:

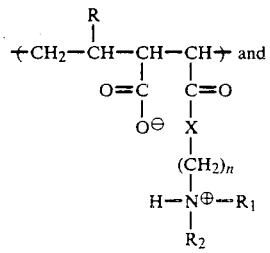 and

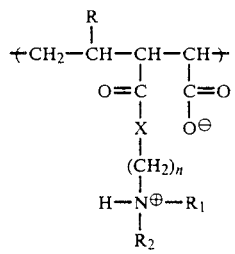

where

R is OR', where R' is $C_1$–$C_8$ alkyl or a lactam,

X is oxygen or nitrogen, n is 2–10, and $R_1$ and $R_2$ are each independently $C_1$–$C_8$ alkyl, and mixtures thereof.

2. A zwitterion polymer according to claim 1 wherein R' is a $C_1$–$C_8$ alkyl.

3. A zwitterion polymer according to claim 1 wherein R' is a lactam.

4. A zwitterion polymer according to claim 1 wherein X is oxygen.

5. A zwitterion polymer according to claim 1 wherein X is nitrogen.

6. A zwitterion polymer according to claim 1 wherein $R_1$ and $R_2$ are both methyl.

7. A zwitterion polymer according to claim 1 which is dissolved in aqueous solution at pH of 7.

* * * * *